P. RICHARD.
BOX.
APPLICATION FILED MAY 19, 1914.

1,139,801.

Patented May 18, 1915.
2 SHEETS—SHEET 1.

Witnesses:—
Frederick R. Moran
H. P. Hater

Inventor
Paul Richard,
By Victor J. Evans
Attorney

P. RICHARD.
BOX.
APPLICATION FILED MAY 19, 1914.
1,139,801.
Patented May 18, 1915.
2 SHEETS—SHEET 2.
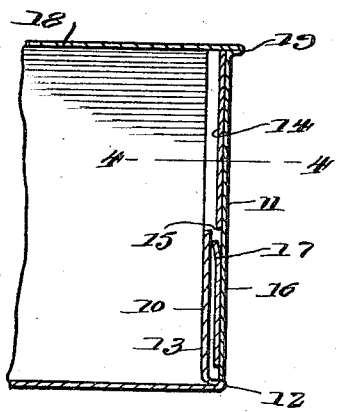
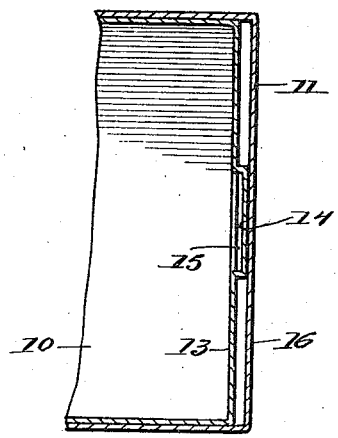
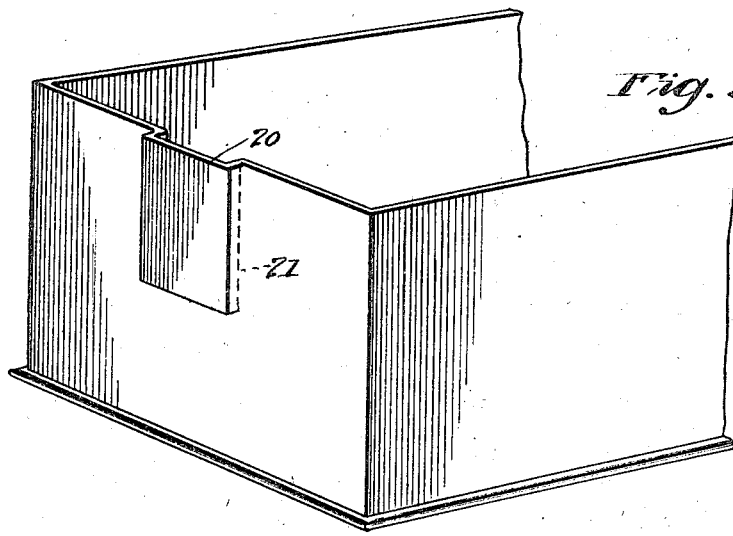
Witnesses:—
Frederick P. Moran
Inventor
Paul Richard,
By Victor J. Evans
Attorney

UNITED STATES PATENT OFFICE.

PAUL RICHARD, OF LEBANON, PENNSYLVANIA.

BOX.

1,139,801.

Specification of Letters Patent.  Patented May 18, 1915.

Application filed May 19, 1914.  Serial No. 839,637.

*To all whom it may concern:*

Be it known that I, PAUL RICHARD, a citizen of the United States, residing at Lebanon, in the county of Lebanon and State of Pennsylvania, have invented new and useful Improvements in Boxes, of which the following is a specification.

An object of the invention is to provide a box particularly adaptable for use as a candy or confection box and which, after being initially filled and closed, will be sealed so that it cannot be opened without mutilating the box to an extent which would prevent its effective reuse for other purposes.

The invention embodies, among other features, the provision of a box which will be so mutilated when it is opened after being initially filled that it cannot be commercially reused by other dealers or purchasers for the purpose of filling the box with an inferior grade of confection or the like.

The invention still further resides in a box which can be of any desired shape or configuration and which can be cheaply manufactured to accomplish the desired result.

Figure 1:
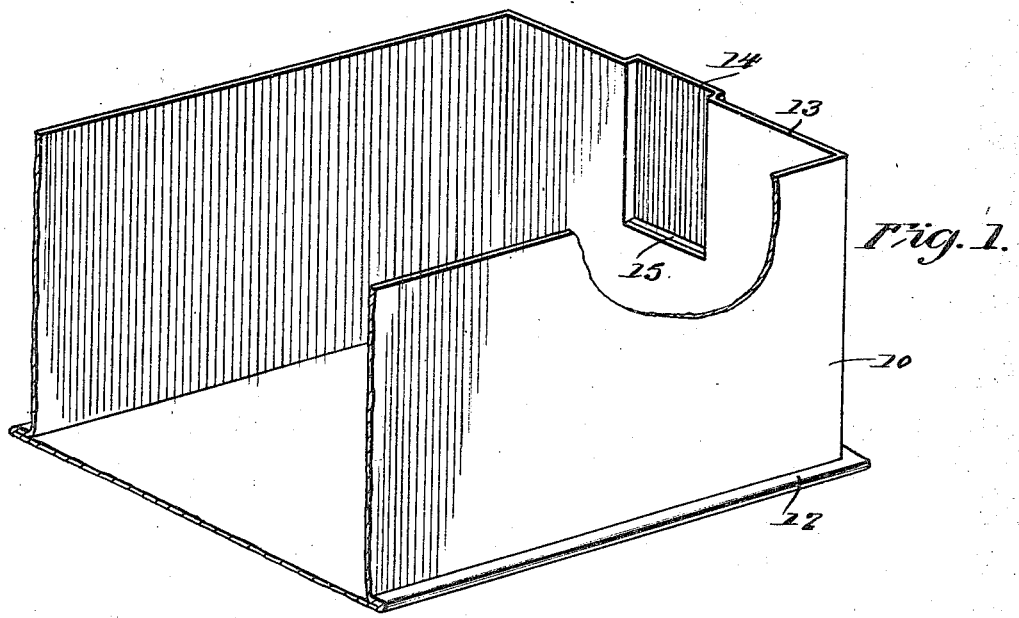
Figure 2:
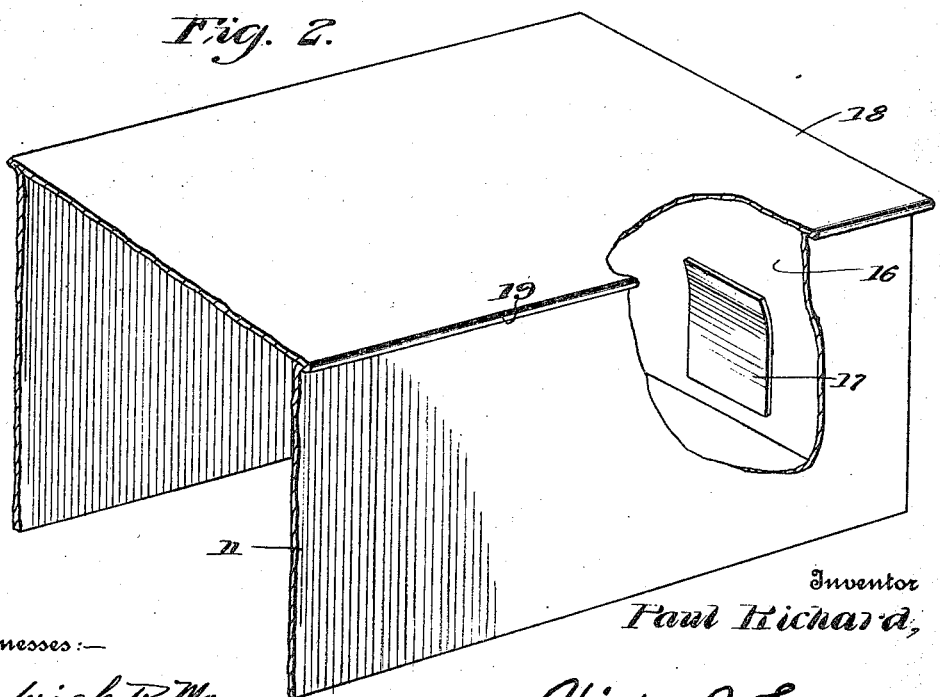

In the further disclosure of the invention reference is to be had to the accompanying drawings, constituting a part of this specification, in which similar characters of reference denote corresponding parts in all the views, and in which:

Figure 1 is a fragmentary perspective view of the bottom or lower section of the box; Fig. 2 is a fragmentary perspective view of the cover or top section looking at an inner face of the end thereof; Fig. 3 is a vertical longitudinal sectional view taken through the box with the cover in position, showing the manner of locking the cover on the body of the box; Fig. 4 is a horizontal sectional view taken on the line 4—4 in Fig. 3; and Fig. 5 is a fragmentary perspective view of a modified form of box body.

Referring more particularly to the views, I provide a box body 10 and a cover 11 therefor, said box body constituting the lower section and the cover constituting the upper section of the completed box, with the cover adapted to fit over the box body and substantially close its sides and ends. The box body is preferably formed with a lower continuous flange 12 and provides ends 13, each of which has an outwardly struck portion 14 terminating at its lower end in a transverse slot 15.

Similarly, the box body 10 has the inner face of each end 16 provided with a locking tongue 17 which is preferably secured to the inner face of each end at its inner extremity and has its free end loose from the inner face and slightly curved, with the locking tongue projecting upwardly toward the top of the cover. The top is indicated by the numeral 18 and preferably has an outwardly struck continuous flange 19 similar to the flange 12. It will be understood, however, that this flange can be readily dispensed with and is simply used for the purpose of reinforcing the cover and adding to its appearance.

When the box body has been initially filled with candy or some other confection the cover is slipped over the top of the box body and when the cover is arranged in closed position it will be apparent that the free end of the locking tongue 17 will lie below the slot 15 and in the vertical transverse plane of the slot and outwardly struck portion of the box body. On account of the locking tongue having its free end adapted to normally be spaced from the inner face of the end of the cover to which the tongue is attached it will be apparent that when an attempt is made to remove the cover from the box body the free end of the locking tongue will pass through the slot and thus hold the cover in locked position relatively to the box body so that if a continued upward pull is exerted on the cover the locking tongues will be torn from the cover in removing the same from the box body, thus so mutilating the cover that it cannot be effectively reused in the same manner and furthermore giving notice to the public or purchaser that the box has been reused and in all probability contains an inferior candy or confection.

In order to afford a further mutilation of the box so as to prevent its commercial reuse, I show a modified form of box body and in which instance the outwardly struck portion is indicated by the numeral 20 and is preferably encircled by a weakened line 21 so that when the modified form of box body is used in connection with the cover described a strong upward pull on the cover for the purpose of removing the same from the box body will not only tend to tear the locking tongue but will also tend to tear the outwardly struck portion 20 along the weakened line 21 so that upon removing the cover from the box body the cover and box body will be both simultaneously mutilated to an extent which would prevent commercial reuse of the box.

As mentioned heretofore, the box is preferably used for candy or other confections, but it will be understood that it can be used for various purposes; that the box can be constructed in any desired shape and that the locking tongue can be glued or otherwise arranged upon the cover in order that it will properly coöperate with the box body to accomplish the desired result.

Having thus described my invention, I claim:

In a box, the combination with a box body provided at each end with an outwardly struck portion, extending downwardly from the edge of the end, with the inner extremity of the outwardly struck portion provided with a slot, of a cover for the box body, and locking tongues, one arranged on the inner face of each end of the cover, each locking tongue projecting upwardly from the lower edge of the cover and adapted to have its free end bear against the face of the outwardly struck portion when the cover is arranged upon the body so that when the cover is in closed position the free end of the tongue will lie in the plane of the slot and extend therein upon an attempt to remove the cover from the box, thereby holding the cover in locked position on the box, said outwardly struck portions and tongues lying in the same vertical plane and arranged centrally with respect to the ends of the box body and cover, respectively, upon which they are formed.

In testimony whereof I affix my signature in presence of two witnesses.

PAUL RICHARD.

Witnesses:
D. W. HAIN,
CHARLES KLEISER.